US009497642B2

(12) United States Patent
Claussen et al.

(10) Patent No.: US 9,497,642 B2
(45) Date of Patent: *Nov. 15, 2016

(54) METHOD OF AUTOMATICALLY CONFIGURING A HOME BASE STATION ROUTER

(75) Inventors: Holger Claussen, Swindon (GB); Lester Tse Wee Ho, Swindon (GB); Paul A. Polakos, Marlboro, NJ (US); Louis Gwyn Samuel, Swindon (GB)

(73) Assignee: Alcatel Lucent, Boulogne-Billancourt (FR)

(*) Notice: Subject to any disclaimer, the term of this patent is extended or adjusted under 35 U.S.C. 154(b) by 2753 days.

This patent is subject to a terminal disclaimer.

(21) Appl. No.: 11/771,644

(22) Filed: Jun. 29, 2007

(65) Prior Publication Data
US 2009/0005043 A1 Jan. 1, 2009

(51) Int. Cl.
| H04B 7/00 | (2006.01) |
| H04W 24/02 | (2009.01) |
| H04W 36/00 | (2009.01) |
| H04W 52/32 | (2009.01) |
| H04W 84/04 | (2009.01) |
| H04W 88/08 | (2009.01) |

(52) U.S. Cl.
CPC ............ *H04W 24/02* (2013.01); *H04W 36/00* (2013.01); *H04W 52/325* (2013.01); *H04W 84/045* (2013.01); *H04W 88/08* (2013.01)

(58) Field of Classification Search
USPC ............... 455/436, 522, 422.1, 403
See application file for complete search history.

(56) References Cited

U.S. PATENT DOCUMENTS

| 5,940,761 | A | 8/1999 | Tiedemann, Jr. et al. ..... 455/437 |
| 6,195,551 | B1 | 2/2001 | Kim et al. ................. 455/436 |
| 6,347,220 | B1 | 2/2002 | Tanaka et al. ............. 455/277.2 |
| 6,539,206 | B1* | 3/2003 | Min et al. ..................... 370/331 |
| 2001/0034233 | A1* | 10/2001 | Tiedemann, Jr. ...... H04W 36/30 455/436 |
| 2001/0055288 | A1* | 12/2001 | Uebayashi et al. .......... 370/331 |
| 2002/0058506 | A1 | 5/2002 | Amin et al. ................ 455/432 |
| 2002/0107021 | A1 | 8/2002 | Ishikawa et al. ............ 455/436 |
| 2003/0148774 | A1 | 8/2003 | Naghian et al. ............. 455/456 |
| 2004/0166863 | A1 | 8/2004 | Kim et al. .................. 455/449 |
| 2004/0242257 | A1* | 12/2004 | Valkealahti et al. ......... 455/522 |
| 2005/0009548 | A1 | 1/2005 | Kelley et al. ................ 455/509 |
| 2005/0136960 | A1 | 6/2005 | Timus et al. ................ 455/522 |
| 2005/0148368 | A1* | 7/2005 | Scheinert et al. ........... 455/561 |
| 2005/0250527 | A1 | 11/2005 | Jugl et al. .................. 455/522 |
| 2006/0018289 | A1* | 1/2006 | Schulist ............... H04W 52/50 370/335 |
| 2006/0058055 | A1* | 3/2006 | Shintani ............... H04W 52/12 455/522 |
| 2006/0068849 | A1 | 3/2006 | Bernhard et al. ......... 455/562.1 |
| 2006/0069526 | A1 | 3/2006 | Kaiser et al. ............... 702/150 |
| 2006/0084475 | A1* | 4/2006 | Ohkubo ............... H04B 7/0608 455/562.1 |
| 2006/0121930 | A1* | 6/2006 | Miyoshi et al. ............. 455/522 |
| 2006/0145051 | A1* | 7/2006 | Kawai et al. ............... 250/201.1 |
| 2006/0154670 | A1* | 7/2006 | Miyabayashi et al. ....... 455/450 |

(Continued)

OTHER PUBLICATIONS

Snyder et al., "Indoor Wireless Networks: Issues and Answers" retrieved from internet www.rfdesign.com Apr. 2002.

*Primary Examiner* — Dai A Phuong
(74) *Attorney, Agent, or Firm* — Davidson Sheehan LLP

(57) ABSTRACT

The present invention provides a method of automatically configuring a base station router. The method includes modifying a transmission power for a pilot signal transmitted by the base station router. The modification of the transmission power is determined based upon a frequency of mobility-related procedure requests received by the base station router.

16 Claims, 2 Drawing Sheets

(56) References Cited

U.S. PATENT DOCUMENTS

| | | |
|---|---|---|
| 2006/0209808 A1 | 9/2006 | Lundby et al. ............... 370/355 |
| 2007/0249347 A1* | 10/2007 | Saifullah et al. ............. 455/436 |
| 2007/0253372 A1* | 11/2007 | Nakayasu .................... 370/331 |
| 2008/0057933 A1* | 3/2008 | Brunner ..................... 455/422.1 |
| 2008/0070610 A1* | 3/2008 | Nishio ............... H04W 74/085 |
| | | 455/509 |
| 2008/0090512 A1 | 4/2008 | Little et al. ........................ 455/1 |
| 2008/0096566 A1* | 4/2008 | Brunner et al. ............. 455/437 |
| 2008/0132222 A1 | 6/2008 | Brady ........................ 455/422.1 |
| 2008/0182584 A1 | 7/2008 | Le ................................ 455/446 |
| 2008/0188265 A1 | 8/2008 | Carter et al. .................. 455/561 |
| 2009/0156247 A1 | 6/2009 | Claussen et al. ............. 455/522 |
| 2009/0163224 A1 | 6/2009 | Dean et al. ................. 455/456.1 |
| 2009/0238101 A1* | 9/2009 | Nanda et al. ................. 370/254 |
| 2009/0298470 A1 | 12/2009 | Huber et al. .................. 455/411 |
| 2009/0318181 A1 | 12/2009 | Tao et al. ...................... 455/522 |
| 2010/0056184 A1 | 3/2010 | Vakil et al. ................. 455/456.5 |
| 2010/0099413 A1* | 4/2010 | Kubo ................... H04W 48/20 |
| | | 455/435.2 |

\* cited by examiner

METHOD OF AUTOMATICALLY CONFIGURING A HOME BASE STATION ROUTER

BACKGROUND OF THE INVENTION

1. Field of the Invention

This invention relates generally to communication systems, and, more particularly, to wireless communication systems.

2. Description of the Related Art

Conventional wireless communication systems use a network of base stations to provide wireless connectivity to one or more mobile units. In some cases, the mobile units may initiate wireless communication with one or more base stations in the network, e.g., when the user of the mobile unit would like to initiate a voice or data call. Alternatively, the network may initiate the wireless communication link with the mobile unit. For example, in conventional hierarchical wireless communications, a server transmits voice and/or data destined for a target mobile unit to a central element such as such as a Radio Network Controller (RNC). The RNC may then transmit paging messages to the target mobile unit via one or more base stations. The target mobile unit may establish a wireless link to one or more of the base stations in response to receiving the page from the wireless communication system. A radio resource management function within the RNC receives the voice and/or data and coordinates the radio and time resources used by the set of base stations to transmit the information to the target mobile unit. The radio resource management function can perform fine grain control to allocate and release resources for broadcast transmission over a set of base stations.

One alternative to the conventional hierarchical network architecture is a distributed architecture including a network of access points, such as base station routers, that implement distributed communication network functionality. For example, each base station router may combine RNC and/or PDSN functions in a single entity that manages radio links between one or more mobile units and an outside network, such as the Internet. Base station routers wholly encapsulate the cellular access technology and may proxy functionality that utilizes core network element support to equivalent IP functions. For example, IP anchoring in a UMTS base station router may be offered through a Mobile IP Home Agent (HA) and the GGSN anchoring functions that the base station router proxies by through equivalent Mobile IP signaling. Compared to hierarchical networks, distributed architectures have the potential to reduce the cost and/or complexity of deploying the network, as well as the cost and/or complexity of adding additional wireless access points, e.g. base station routers, to expand the coverage of an existing network. Distributed networks may also reduce (relative to hierarchical networks) the delays experienced by users because packet queuing delays at the RNC and PDSN of hierarchical networks may be reduced or removed.

At least in part because of the reduced cost and complexity of deploying a base station router, base station routers may be deployed in locations that are impractical for conventional base stations. For example, a base station router may be deployed in a residence or building to provide wireless connectivity to the occupants of the residents of the building. Base station routers deployed in a residence are typically referred to as home base station routers because they are intended to provide wireless connectivity to a micro-cell that encompasses a residence. However, the functionality in a home base station router is typically quite similar to the functionality implemented in a conventional base station router that is intended to provide wireless connectivity to a macro-cell that may cover an area of approximately a few square kilometers. One important difference between a home base station router and a conventional base station router is that home base station routers are designed to be plug-and-play devices that can be purchased off-the-shelf and easily installed by a lay person.

Deployment of home base station routers may result in a very large number of micro-cells, which may overlap with or be encompassed by one or more macro-cells. The presence of the micro-cells may disrupt the careful cell planning and optimization used to configure the macro-cells. For example, if a mobile unit that has a communication session with a base station router serving a macro-cell passes into an overlapping micro-cell, the mobile unit may send a message to the base station router requesting that the micro-cell be added to the mobile unit's active set. The base station router may then allocate resources for a potential soft or hard handoff to the home base station router serving the micro-cell. Consequently, the presence of a large number of micro-cells may undesirably increase the signaling overhead of the wireless communication network. One possible solution to this problem is to have a technician perform cell optimization for every home base station router. However, this approach would be very costly and run contrary to the goal of making home base station routers function as plug-and-play devices.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for automatically configuring a base station router. The method includes modifying a transmission power for a pilot signal transmitted by the base station router. The modification of the transmission power is determined based upon a frequency of mobility-related procedure requests received by the base station router.

BRIEF DESCRIPTION OF THE DRAWINGS

The invention may be understood by reference to the following description taken in conjunction with the accompanying drawings, in which like reference numerals identify like elements, and in which.

Figure 1:
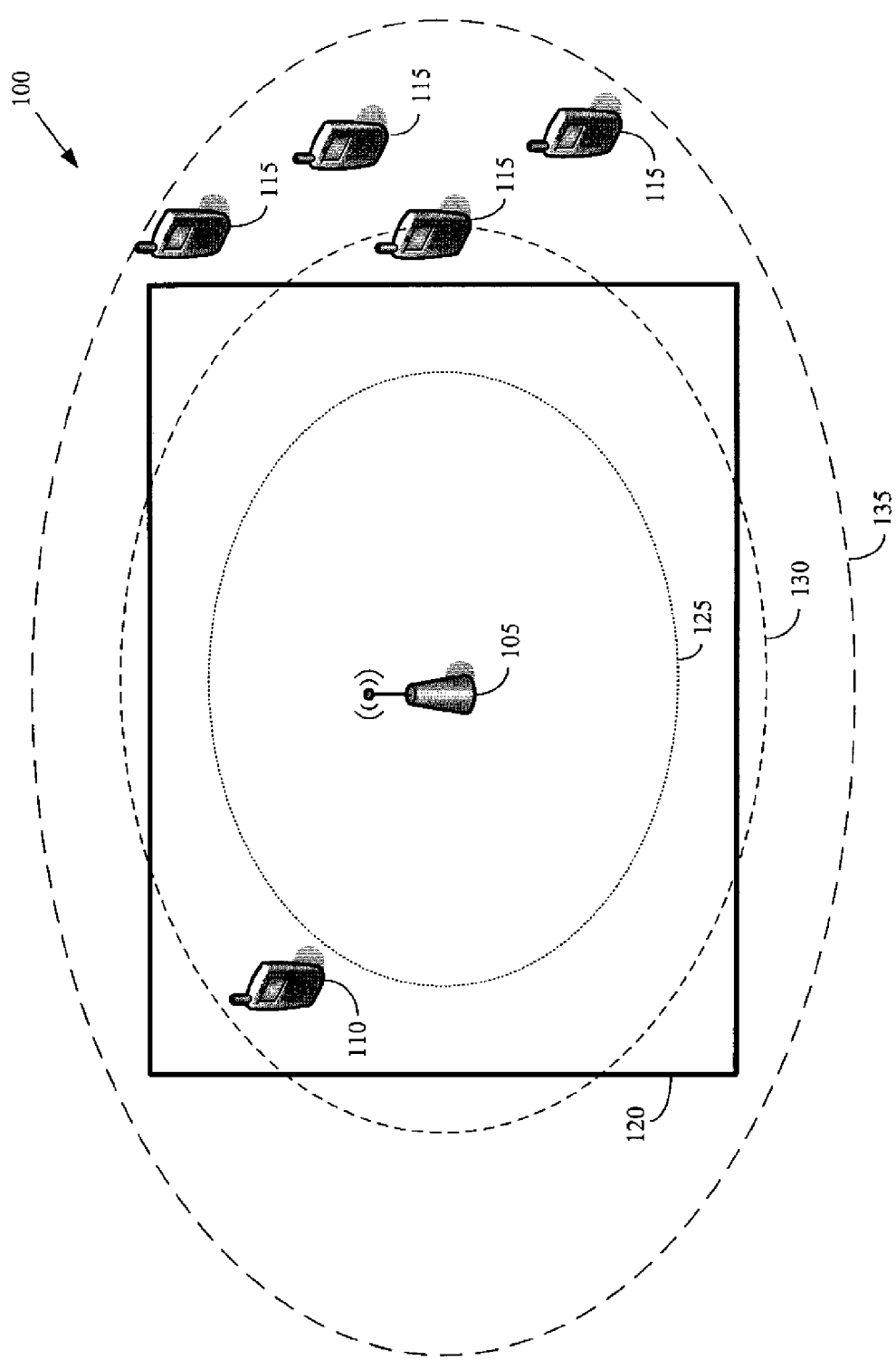
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 includes one or more home base station routers 105 for providing wireless connectivity. The home base station router 105 may provide wireless connectivity according to standards and/or protocols including, but not limited to, Universal Mobile Telecommunication Services (UMTS) standards and/or protocols, Global System for Mobile communication (GSM) standards and/or protocols, WiMAX standards and/or protocols, IEEE standards and/or protocols, and the like. Furthermore, persons of ordinary skill in the art having benefit of the present disclosure should appreciate that the present invention is not limited to using home base station routers 105 to provide wireless connectivity. In alternative embodiments, devices such as base stations, base station routers, access points, access networks, and the like may be used to provide wireless connectivity in the wireless communication system 100.

The home base station router 105 is configured to transmit a pilot signal at a selected transmission power. Mobile units 110, 115 that are proximate to the home base station router 105 may detect the transmitted pilot signal and use the pilot signal to determine whether the home base station router 105 may be selected as a serving home base station router 105. For example, a mobile unit 110, 115 that detects and successfully decodes the pilot signal transmitted by the home base station router 105 may add the home base station router 105 to an active list of the base station routers. The mobile units 110, 115 may handoff to base station routers in the active list, either by a hard handoff from one base station router to another or by a soft handoff in which the mobile units 110, 115 are in concurrent communication with multiple base stations. In alternative embodiments, the mobile units 110, 115 may also trigger other mobility-related events using mobility-related procedure requests that are transmitted to the home base station router 105. Techniques for transmitting pilot signals, detecting the presence of base station routers using the pilot signals, adding base station routers to an active list, and handing off between base station routers are known in the art and in the interest of clarity only those aspects of these procedures that are relevant to the present invention will be discussed herein.

In alternative embodiments, the mobile units 110, 115 may also trigger other mobility-related events using mobility-related procedure requests that are transmitted to the home base station router 105. As used herein, the term "mobility-related procedure request" will be understood to refer to messages and/or signals transmitted by the mobile units 110, 115 to indicate a change and/or modification in the location of the mobile unit 110, 115 and/or the access points associated with the mobile unit 110, 115. Exemplary mobility-related procedure requests include location area update requests, routing area date requests and similar request messages that may be transmitted when the mobile units 110, 115 are in an idle mode and moved within range of the home base station router 105. The associated mobility-related event for these mobility-related procedure requests may be that the mobile unit 105, 115 camps on the home base station router 105. Other mobility-related procedure events include General Packet Radio Service (GPRS) attach procedures that are initiated when the mobile units 110, 115 having an existing data session comes within range of the home base station router 105. The GPRS attach procedures and the messages transmitted by the mobile units 110, 115 to initiate these procedures are defined by UMTS standards and/or protocols. However, persons of ordinary skill in the art having benefit of the present disclosure should appreciate that the present invention is not limited to these specific examples of mobility-related procedure requests and other mobility-related procedure requests and mobility-related events may be defined by other standards and/or protocols.

The home base station router 105 is intended to provide coverage to an area that approximately encompasses a building 120 that includes one or more mobile units 110 that are registered with the home base station router 105. The mobile units 110 may be registered with the home base station router 105 using a variety of techniques including having a user enter the IMSI for the registered mobile units 110 via a webpage, using a handshaking protocol between the mobile units 110 and the home base station router 105, and the like. The particular technique for registering the mobile units 110 is a matter of design choice and not material to the present invention. A list of the registered mobile units 110 is then made available to the home base station router 105. In one embodiment, the home base station router 105 contains a database including the IMSI values for the registered mobile units 110.

The transmission power of the pilot signal transmitted by the home base station router 105 should be large enough to provide a pilot signal strength that is strong enough to be detected by registered mobile units 110 within the building 120 but not so large that unregistered mobile units 115 outside of the building 120 request a large number of handovers to the home base station router 105. For example, if the pilot signal transmission power is set to a relatively low value, then the coverage area 125 may not be large enough to provide wireless connectivity to the registered mobile unit 110 and/or to keep an idle mobile unit 110 camped on the home base station router 105. Increasing the pilot signal transmission power may allow the home base station router 125 to provide wireless connectivity to a larger coverage area 130 that allows the registered mobile unit 110 to contact and/or remain camped on the home base station router 105. However, if the pilot signal transmission power is increased to reach the coverage area 135, a large number of unregistered mobile units 115 may begin to request handovers to the home base station router 105.

The actual pilot signal strength that is appropriate for the building 120 depends on the size and configuration of the building 120. For example, the pilot signal strength that is appropriate for a three-bedroom home may be significantly different than the pilot signal strength that is appropriate for an office building including 40 offices. Furthermore, the pilot signal strength that is appropriate for the building 120 may vary in time due to factors such as relocation of the home base station router 105 within the building 120, changes in the environment inside and/or outside of the building 120, variations in the density of mobile units 110, 115 near the building 120, and the like. Accordingly, the home base station router 105 is configured to dynamically adjust the pilot signal strength or based on a frequency of handover requests, or other mobility-related procedure requests, from mobile units 110, 115.

Figure 2:
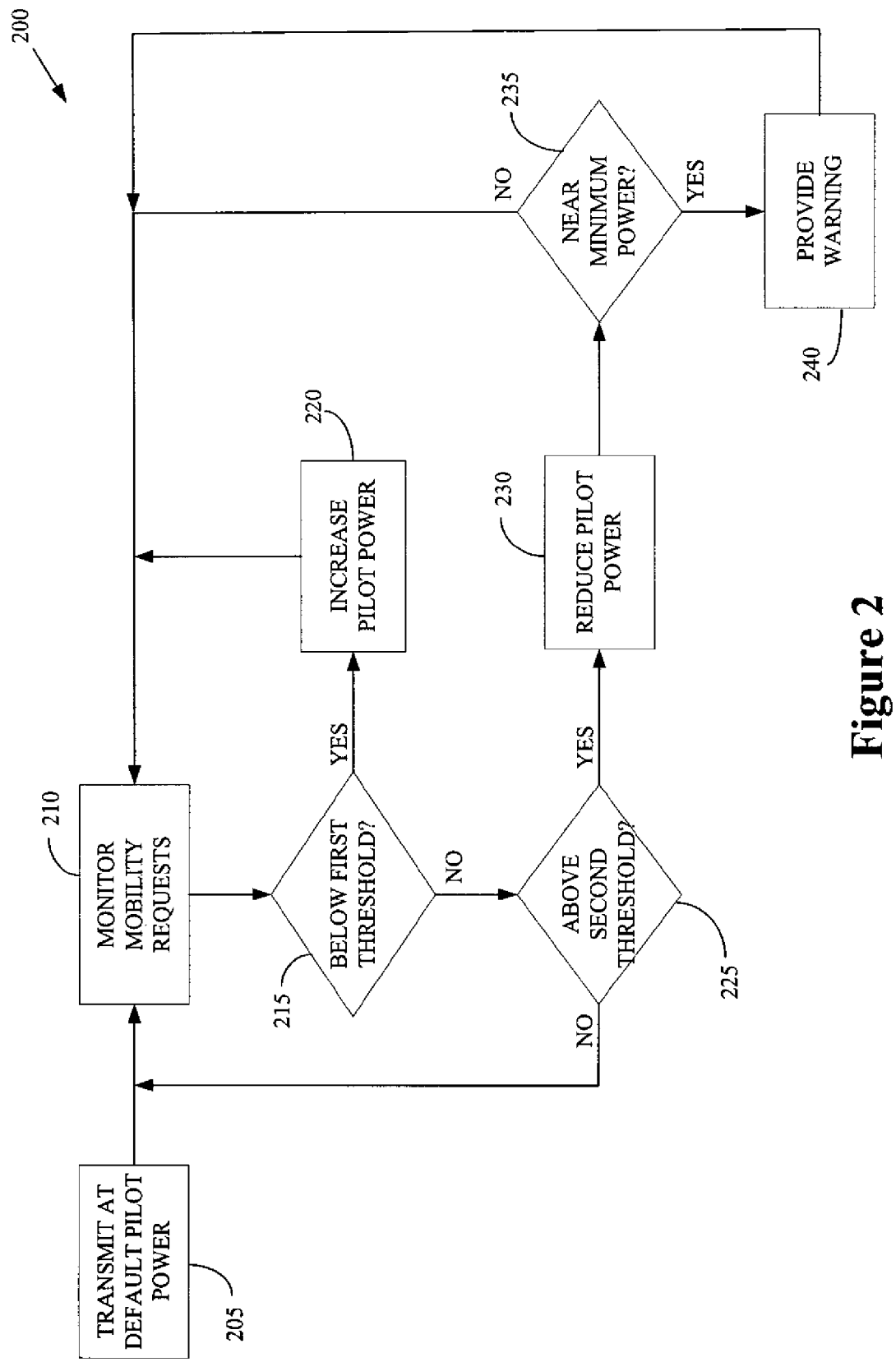
FIG. 2 conceptually illustrates one exemplary embodiment of a method of adjusting a pilot signal transmission power, in accordance with the present invention.

FIG. 2 conceptually illustrates one exemplary embodiment of a method 200 of adjusting a pilot power strength used by a home base station router. In the illustrated embodiment, the home base station router initially transmits (at 205) a pilot signal at a default pilot signal transmission power. The pilot signal transmission power may be set to the default value when the home base station router is initially powered up. The pilot signal transmission power may also be set to the default value when the home base station router is relocated to another location or in response to detecting an error condition. Alternatively, the pilot signal transmission power may also be set to the default value in response to resetting or rebooting the home base station router, as well as in response to resetting, rebooting, powering down, or powering up other entities such as other computers that are used to manage the home base station router. The default power level is a matter of design choice and not material to the present invention. However, it is envisioned that the default power level may be selected based on a determination of a typical deployment scenario for the home base station router.

The home base station router may then monitor (at 210) handover requests, or other mobility-related procedure requests, from mobile units. In one embodiment, the home base station router monitors (at 210) handover requests for a selected period of time. At the end of a selected period of time, the home base station router determines the number and/or frequency of handover requests or other mobility-related procedure requests. Alternatively, the home base station router may monitor (at 210) handover requests and/or other mobility-related procedure requests substantially continuously and maintain a rolling average of the frequency of handover requests. In one embodiment, the mobility-related procedure requests from mobile units that are registered with the home base station router may not be used to determine the number and/or frequency of mobility-related procedure requests. Accordingly, the number and/or frequency of mobility-related procedure requests from unregistered mobile units may be indicative of the extent to which the coverage area of the home base station router deviates from an optimum coverage configuration that provides the best balance between providing good indoor coverage and causing additional handover signaling as a result of covering too large an area outside of the home. In one embodiment, unregistered mobile units that repeatedly request handovers or other mobility-related procedures related to the home base station router may be recorded in a list or database. The home base station router may then weight (either positively or negatively, depending on the situation) the mobility-related procedure requests from these regular unregistered mobile units when computing the number and/or frequency of mobility-related procedure requests.

The home base station router may determine (at 215) whether the number and/or frequency of mobility-related procedure requests are below a first threshold. If the number and/or frequency of mobility-related procedure requests are below the first threshold, indicating that few or no unregistered mobile units have sent mobility-related procedure requests to the home base station router, the home base station router may increase (at 220) the pilot signal transmission power to expand the coverage area of the home base station router. The home base station router may then continue to monitor (at 210) mobility-related procedure requests and increase (at 220) the pilot signal transmission power until the number and/or frequency of mobility-related procedure requests rises above the first threshold. The value of the first threshold is a matter of design choice and may be varied in different embodiments. In one embodiment, the pilot signal transmission power may be increased until it reaches a predetermined maximum value and then it may remain at this predetermined maximum value until it is reduced.

If the number and/or frequency of mobility-related procedure requests are above the first threshold, then the home base station router may determine (at 225) whether the number and/or frequency of mobility-related procedure requests has risen above a second threshold, indicating that unregistered mobile units have sent a relatively large number of mobility-related procedure requests to the home base station router. As long as the number and/or frequency of mobility-related procedure requests are below the second threshold, the home base station router may continue to monitor (at 210) mobility-related procedure requests and maintain the current pilot signal transmission power. If the number and/or frequency of mobility-related procedure requests are above the second threshold, then the home base station router may reduce (at 230) the pilot signal transmission power to reduce the coverage area of the home base station router. In one embodiment, the second threshold value may be set to be larger than the first threshold value to provide an operating range in which no adjustments to the pilot signal transmission power are made. However, the specific value of the second threshold is a matter of design choice and may be varied in different embodiments.

In the illustrated embodiment, the home base station router may determine (at 235) whether the pilot signal transmission power has fallen near or below a predetermined minimum value. As long as the pilot signal transmission power is not near or below the predetermined minimum value, the pilot signal transmission power may be reduced as necessary. However, if the pilot signal transmission power falls close to or below a predetermined minimum value, then the home base station router may provide (at 240) a warning signal, e.g., an auditory warning signal or a visual warning signal such as a flashing light. The pilot signal transmission power may then be maintained at the minimum power level until the user takes corrective action, such as relocation or resetting of the home base station router, in response to the warning. The home base station router may alternatively provide (at 240) the warning signal in other forms, such as a short messaging service (SMS) message, which may be transmitted to the end-user and/or the operator, as well as to any other desirable entity. In one embodiment, following the warning (at 240), the home base station router may continue to monitor (at 210) mobility-related procedure requests. Alternatively, the method 200 may end after the warning is provided (at 240).

The home base station router may also take other actions that may be useful in some situations. In one embodiment, the home base station router may increase the pilot signal transmission power even though the number and/or frequency of mobility-related procedure requests is within the operating range defined by the first and second thresholds. Periodically increasing the pilot signal transmission power may permit the home base station router to determine that a larger pilot signal transmission power may be used to provide service to a larger coverage area, e.g., in situations where the operating conditions have changed such that the number and/or frequency of mobility-related procedure requests at the larger pilot signal transmission powers has decreased relative to previous measurements. Furthermore, in one embodiment, the home base station router may collect mobility-related procedure statistics and use the mobility-related procedure statistics to build a time-dependent profile of the environment and the mobile units 110, 115. The time-dependent profile may then be used to learn and/or predict the appropriate pilot signal transmission power, e.g., as a function of the time of day and/or to reflect day-to-day variations.

Embodiments of the techniques described herein may have a number of advantages over conventional base station routers that use a predetermined (and fixed) pilot signal strength that is configured by an engineer or technician. For example, dynamically adjusting the cell size according to the environment of the home base station router provides additional flexibility relative to a default fixed pilot signal transmission power, which is typically set to a conservative (relatively low) value. The dynamic pilot signal transmission power adjustment techniques described herein would allow the coverage area of the home base station router to be set at a maximum in areas such as isolated rural houses or large houses or buildings, thereby providing maximum coverage to the users of the home base station router. Alternatively, the coverage area of the home base station router may be automatically confined within the walls of a home or building in a densely populated area that includes numerous private homes or apartments. Furthermore, the distributed nature of these techniques reduces or eliminates the need for any changes to, or communication with, other existing network elements such as legacy networks and/or terminals. Thus, the techniques described herein provide for relatively simple and automatic configuration that may permit the home base station router to achieve an optimal configuration with regard to cell sizing and/or location.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method implemented in a base station router, comprising:
    modifying a transmission power for a pilot signal transmitted by the base station router, the modification of the transmission power being determined based upon a frequency of mobility-related procedure requests received by the base station router.

2. The method of claim 1, comprising determining the frequency of mobility-related procedure requests received by the base station router from mobile units that are not registered with the base station router, and wherein modifying the transmission power comprises modifying the transmission power for the pilot signal based upon the frequency of mobility-related procedure requests received from mobile units that are not registered with the base station router.

3. The method of claim 2, wherein determining the frequency of mobility-related procedure requests comprises determining at least one frequency of mobility-related procedure requests during at least one selected time period.

4. The method of claim 1, wherein modifying the transmission power for the pilot signal comprises increasing the transmission power for the pilot signal when the frequency of mobility-related procedure requests is below a selected threshold.

5. The method of claim 4, wherein modifying the transmission power for the pilot signal comprises continuing to increase the transmission power for the pilot signal as long as the frequency of mobility-related procedure requests remains below the selected threshold.

6. The method of claim 1, wherein modifying the transmission power for the pilot signal comprises reducing the transmission power for the pilot signal when the frequency of mobility-related procedure requests is above a selected threshold.

7. The method of claim 6, wherein modifying the transmission power for the pilot signal comprises continuing to reduce the transmission power for the pilot signal as long as the frequency of mobility-related procedure requests remains above the selected threshold.

8. The method of claim 7, comprising providing a warning if the transmission power for the pilot signal reaches a minimum transmission power and maintaining the transmission power for the pilot signal at the minimum transmission power.

9. The method of claim 1, comprising setting the transmission power for the pilot signal at a default transmission power level in response to at least one of powering up the base station router, rebooting the base station router, or relocating the base station router.

10. The method of claim 1, wherein modifying the transmission power for the pilot signal comprises:
increasing the pilot signal transmission power; and
determining, based on the increased pilot signal transmission power, whether to use a larger pilot signal transmission power to provide service to a larger coverage area based on a change in a frequency of mobility-related procedure requests received by the base station router from mobile units that are not registered with the base station router following the increase in the pilot transmission power.

11. The method of claim 1, comprising:
collecting mobility-related procedure statistics associated with mobility-related events associated with at least one user;
forming at least one time-dependent profile for said at least one user based on the mobility-related procedure statistics;
determining the pilot signal transmission power based on said at least one time-dependent profile.

12. A method implemented in a base station router, comprising:
modifying a transmission power for a pilot signal transmitted bye the base station router, the modification of the transmission power being determined based upon a frequency of mobility-related procedure requests received by the base station router; and
determining the frequency of mobility-related procedure requests received by the base station router from mobile units that are not registered with the base station router, and wherein modifying the transmission power comprises modifying the transmission power for the pilot signal based upon the frequency of mobility-related procedure requests received from mobile units that are not registered with the base station router, wherein determining the frequency of mobility-related procedure requests comprises:
determining whether at least one mobile unit requesting the handover is in a first list of mobile units that are registered with the base station router; and
determining the frequency of mobility-related procedure requests based on requests from mobile units that are not in the first list.

13. The method of claim 12, comprising forming the first list based on input received from at least one user, the input indicating mobile units that are registered with the base station router.

14. The method of claim 13, comprising forming a second list based upon the frequency of mobility-related procedure requests associated with at least one mobile unit, the second list including mobile units that are not in the first list and are not registered with the base station router.

15. The method of claim 14, wherein determining the frequency of mobility-related procedure requests comprises:
applying at least one weight to at least one frequency of mobility-related procedure requests associated with at least one mobile unit in the second list; and
determining the frequency of mobility-related procedure requests based on said at least one weighted frequency of mobility-related procedure requests.

16. A method implemented in a base station router, comprising:
modifying a transmission power for a pilot signal transmitted by the base station router, the modification of the transmission power being determined based upon a frequency of mobility-related procedure requests received by the base station router from mobile units that are not registered with the base station router.

* * * * *